United States Patent [19]
Davis

[11] 3,784,267
[45] Jan. 8, 1974

[54] SQUEEZE FILM BEARING SUPPORT MOVEMENT LIMITING APPARATUS

[75] Inventor: Leonard C. Davis, Indianapolis, Ind.

[73] Assignee: General Motors Corporation, Detroit, Mich.

[22] Filed: Dec. 15, 1972

[21] Appl. No.: 315,343

[52] U.S. Cl. ............................................. 308/174
[51] Int. Cl. ........................................... F16c 19/14
[58] Field of Search ...................... 308/9, 122, 184, 308/174

[56] References Cited
UNITED STATES PATENTS
3,410,616  11/1968  Dee ........................................ 308/9

Primary Examiner—Charles J. Myhre
Assistant Examiner—Frank Susko
Attorney—Paul Fitzpatrick et al.

[57] ABSTRACT

A shaft bearing assembly uses "squeeze film action" to damp vibrations in an annular bearing support member. To prevent the annular support member from rotating about its axis with the shaft but allow the freedom of movement in any radial direction necessary for the squeeze film action, a linking member has one end pivotally connected to the housing and the other pivotally connected to the annular support member near its outer edge. A thrust bearing between the housing and annular support member bears axial loads.

3 Claims, 2 Drawing Figures

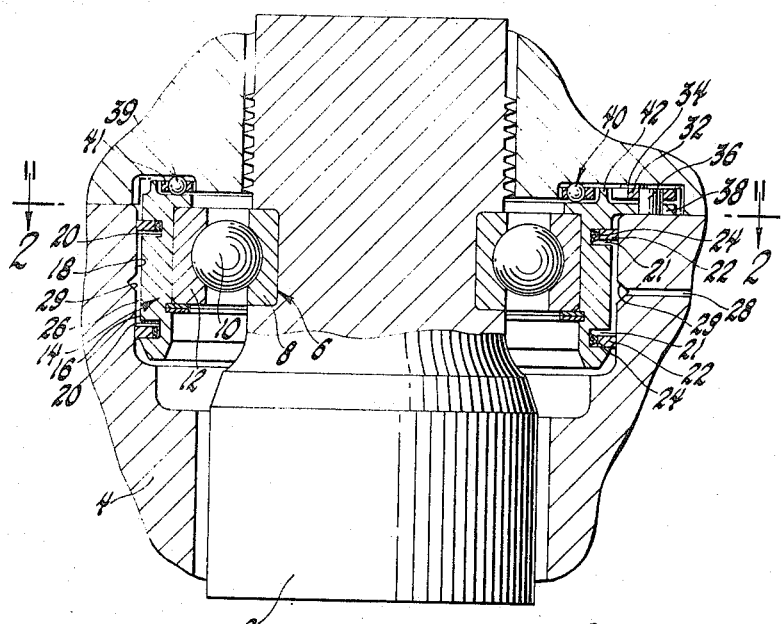

SQUEEZE FILM BEARING SUPPORT MOVEMENT LIMITING APPARATUS

BACKGROUND OF THE INVENTION

One effective apparatus for damping vibrations in a rotating shaft is a squeeze film bearing support. The squeeze film bearing support comprises an annular support member for the outer race of the bearing assembly which has an annular outer surface that fits in a housing with a matching inner surface so that a thin annular gap exists between the two surfaces. One of the surfaces has formed therein a pair of grooves, each of which contains a ring which engages the other surface to enclose the annular space between the housing and annular support member. A viscous liquid such as lubricating oil is forced into this annular space under pressure; and this liquid helps damp vibrations of the shaft and bearing assembly. In the prior art a plurality of somewhat flexible parallel arms arranged circularly in a "squirrel cage" configuration attach the annular support member to the housing. These arms prevent rotation of the annular support member, support axial loads, help support the shaft at rest or low speeds and allow design selection of some critical speeds; and, in addition, they are flexible enough to allow the movement in a radial direction necessary for squeeze film action. However, the squirrel cage is expensive to manufacture ane assemble; and the parts are subject to failure through fatigue.

SUMMARY OF THE INVENTION

My invention performs the function of the squirrel cage at a lower cost. The annular support member is attached to the housing and prevented from rotating with the shaft by a single linking member which preferably has one end pivotally connected to the housing and the other end pivotally connected to the annular support member. A thrust bearing assembly is used in conjunction with the linking member to absorb axial loads; and wave washers may be used with the rings to adjust critical speeds to desired values and help center the shaft at low speeds where squeeze film action is not effective. Further details and objects of my invention will be apparent in the following drawings and specification.

SUMMARY OF THE DRAWINGS

FIG. 1 shows a cutaway view of my invention in its environment.

FIG. 2 is a sectional view along line 2—2 of FIG. 1.

Referring to FIG. 1, a shaft 2, which might be part of a gas turbine engine, is supported in a housing 4 on a bearing assembly 6, which comprises an inner member or race 8, a plurality of rolling members 10 and an outer member or race 12. The inner race 8 is fixed to the shaft 2 for rotation therewith; and the outer race 12 is attached to an annular bearing support member 14. The annular bearing support member 14 has an annular outer surface 16, cylindrical in this embodiment, but potentially of any smooth cross sectional shape, which outer surface 16 has a diameter slightly smaller than that of a matching inner annular surface 18 of the housing 4. The annular bearing support member 14 has a pair of grooves 20 breaking its outer surface 16; and in each of the grooves 20 is a sealing ring 22, similar to a piston ring used in a reciprocating piston engine, which may be biased radially outward by a spring member such as wave washer 24. The sealing rings 22 engage the cylindrical inner surface 18 of the housing 4 to create an annular space 26. The grooves 20 and rings 22 could also be placed in the inner surface 18 of the housing 4, if desired, to create the same annular space 26. An oil supply channel 28, formed in the housing 4, connects the annular space 26 with fluid supply means, not shown. A viscous fluid, such as oil, is pumped by the fluid supply means through the channel 28 into the annular space 26 under a preselected pressure. Each of the sealing rings 22 has a gap 30, generally between 0.005 and 0.015 inch wide, which allows the escape of enough heated lubricant from the annular space 26 to help cool the apparatus surrounding the annular space 26. However, the rings 22 retain enough fluid so that the pressure of the fluid within the annular space 26 can be maintained between 30 and 60 psi.

When the shaft 2 is still or rotating slowly, its weight and that of the bearing assembly 6 and annular support member 14 is born by the rings 22 and wave washers 24, if present. As the rotational speed of the shaft 2 increases, rotational imbalances cause the axis of the shaft to rotate slightly about the axis of the inner surface 18 of the housing 4. The shaft 2 causes the annular support member 14 to perform this circular motion and the surface 16 and 18 tend to squeeze together at a point which describes a circular motion at the same frequency. The pressurized fluid, however, squeezed between the surfaces 16 and 18, in what is known as squeeze film action, forms a positive pressure wedge in front of the rotating squeeze point which assists the rings 22 and wave washers 24 in preventing the surfaces 16 and 18 from coming into contact. With a fluid supply pressure of 30 psi or more, a negative pressure distribution is created behind the squeeze point. If the elemental pressures are summed around the annular support member 14, the radial components cancel and the tangential components form a net torque which resists whirl ane thereby damps rotational vibrations. To assure the supply of fluid to both sides of the rotating squeeze point, annular channels 21 axially inward of the rings 22 in the grooves 20 and another annular channel 29 intersecting the inner end of the oil supply channel 28 are supplied in the annular bearing support member 14 and housing 4, respectively.

Since an annular bearing support member 14 which rolled around the inner surface 18 of the housing 4 would not create the desired squeeze film action and might, in addition, cause the sealing rings 22 to wear out through excessive rubbing against the inner surface 18 of the housing 4, it is necessary that the annular bearing support member 14 not rotate with the shaft 2. Referring to FIG. 2, the linking member 32 is pivotally connected at one end to a pin 34 which projects from the housing 4 with an axis parallel to that of the shaft 2. Near its other end, the linking member 32 is pivotally connected to a pin 36 which projects from a radial extension 38 of the annular bearing support member 14 with an axis parallel to that of the shaft 2. Thus, rotation of the annular bearing support member 14 and its sealing rings 22 about their axes in the housing 4 is prevented; but translational motion of these parts in any radial direction, and therefore squeeze film action, is allowed.

The linking member 32 shown in this embodiment is rigid and pivotally connected at both ends. If the shaft is only to rotate in one direction, a flexible linking member such as a steel cable could be used; and, if so, one or both of its ends could be rigidly rather than pivotally held.

To absorb axial loads on the shaft 2, a thrust bearing assembly 40, comprising a plurality of rolling members 39 in a cage 41, is positioned axially between the annular bearing support member 14 and the housing 4 and is retained by a circular projecting ridge 42 of the annular bearing support member 14.

I claim:

1. Apparatus for limiting the movement of a squeeze film bearing support member in a housing, the squeeze film bearing support member and housing having corresponding annular inner and outer surfaces, respectively, with axially spaced sealing rings positioned therebetween to form an annular space for the retention of fluid under pressure for the damping of vibrations induced in the squeeze film bearing support member by a bearing and rotating shaft supported therein, the apparatus comprising, in combination:

a linking member connected between the squeeze film bearing support member at a point radially outward of its axis and the housing to limit rotation of the squeeze film bearing support member, the linking member being oriented in a plane generally perpendicular to said axis of the squeeze film bearing support member;

and a thrust bearing between the squeeze film bearing support member and the housing to support axial loads therebetween.

2. The apparatus of claim 1 in which the linking member is pivotally connected to the housing and squeeze film bearing support member for movement in its plane of orientation.

3. The apparatus of claim 2 additionally comprising spring members set in grooves in one of the annular surfaces to bias the rings against the other annular surface and further limit movement of the squeeze film bearing support.

* * * * *